(12) United States Patent
Xu et al.

(10) Patent No.: US 12,525,663 B2
(45) Date of Patent: Jan. 13, 2026

(54) CONTROL OF ALTERNATING CURRENT BATTERY HEATING USING IN-SITU MEASUREMENTS

(71) Applicant: GM GLOBAL TECHNOLOGY OPERATIONS LLC, Detroit, MI (US)

(72) Inventors: Shuonan Xu, Troy, MI (US); Neeraj S. Shidore, Novi, MI (US); Robert D. Schmidt, Bloomfield Hills, MI (US); Steven Earl Muldoon, Royal Oak, MI (US); Chandra S. Namuduri, Troy, MI (US); Robert D. Drexler, Madison Heights, MI (US); Antonio Duaine Ulisse, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 443 days.

(21) Appl. No.: 18/085,050

(22) Filed: Dec. 20, 2022

(65) Prior Publication Data

US 2024/0204284 A1    Jun. 20, 2024

(51) Int. Cl.
| | |
|---|---|
| *H01M 10/615* | (2014.01) |
| *G01R 31/389* | (2019.01) |
| *H01M 10/48* | (2006.01) |
| *H01M 10/63* | (2014.01) |
| *H01M 10/657* | (2014.01) |

(52) U.S. Cl.
CPC ........ *H01M 10/615* (2015.04); *G01R 31/389* (2019.01); *H01M 10/486* (2013.01); *H01M 10/63* (2015.04); *H01M 10/657* (2015.04)

(58) Field of Classification Search
CPC .............. G01R 31/389; H01M 10/486; H01M 10/615; H01M 10/625; H01M 10/63; H01M 10/657; H01M 2220/20; Y02E 60/10
See application file for complete search history.

(56) References Cited

FOREIGN PATENT DOCUMENTS

CN          111137149 A    *    5/2020    .......... H01M 10/615

OTHER PUBLICATIONS

Machine translation CN111137149A (Year: 2020).*

* cited by examiner

*Primary Examiner* — Victoria H Lynch
(74) *Attorney, Agent, or Firm* — CANTOR COLBURN LLP

(57) ABSTRACT

A device for thermal control of a battery system includes a heating control module configured to generate an alternating current (AC) heating current and heat the battery system to a desired temperature by applying the AC heating current to the battery system over a selected heating time duration. The heating control module is configured to monitor a rate of increase of a temperature of the battery system during the applying, during the heating time duration, perform a periodic impedance measurement, the periodic impedance measurement including application of a measurement signal having a selected frequency range to the battery system for a measurement period, a length of the measurement period select to minimize a difference between a desired rate of increase and the monitored rate of increase, and adjust the AC heating current during the applying based on the temperature and the impedance measurement.

20 Claims, 5 Drawing Sheets

CONTROL OF ALTERNATING CURRENT BATTERY HEATING USING IN-SITU MEASUREMENTS

INTRODUCTION

The subject disclosure relates to thermal control of batteries, and more specifically, to heating a battery assembly or system using an applied electrical current.

Vehicles, including gasoline and diesel power vehicles, as well as electric and hybrid electric vehicles, feature battery storage for purposes such as powering electric motors, electronics and other vehicle subsystems. Many battery systems and electric vehicles feature thermal control systems for heating battery modules to maintain proper operating temperatures. During battery heating using applied current, battery properties are monitored to achieve a desired temperature at a desired heating rate. Such properties include temperature, voltage, current and impedance. It is desirable to provide a device or system that can provide accurate measurements of impedance and other properties for more effective control of battery heating processes.

SUMMARY

In one exemplary embodiment, a device for thermal control of a battery system includes a heating control module configured to generate an alternating current (AC) heating current and heat the battery system to a desired temperature by applying the AC heating current to the battery system over a selected heating time duration. The heating control module is configured to monitor a rate of increase of a temperature of the battery system during the applying, during the heating time duration, perform a periodic impedance measurement, the periodic impedance measurement including application of a measurement signal having a selected frequency range to the battery system for a measurement period, a length of the measurement period select to minimize a difference between a desired rate of increase and the monitored rate of increase, and adjust the AC heating current during the applying based on the temperature and the impedance measurement.

In addition to one or more of the features described herein, the heating control module is configured to perform a temperature measurement simultaneously with the periodic impedance measurement.

In addition to one or more of the features described herein, performing the periodic impedance measurement includes pausing application of the AC heating current during the measurement period.

In addition to one or more of the features described herein, the application is performed during a first heating period and a second heating period, the measurement period occurring between the first heating period and the second heating period.

In addition to one or more of the features described herein, the heating control module is configured to monitor an impedance of the battery system at a frequency of the AC heating current during the first heating period and the second heating period, and wherein the selected frequency range of the periodic impedance measurement is different than the frequency of the AC heating current.

In addition to one or more of the features described herein, the length of the measurement period is selected based on at least one of a property of the battery system, and an expected temperature range.

In addition to one or more of the features described herein, the length of the measurement period is selected based on an age of the battery system.

In addition to one or more of the features described herein, the heating control module is electrically connected to the battery system and a conversion device configured to control power output from the battery system, the heating control module configured to control the conversion device to generate the AC heating current.

In addition to one or more of the features described herein, the battery system is connected to an electric motor connected to an inverter, and the heating control module is configured to control a phase leg of the inverter to generate the AC heating current.

In one exemplary embodiment, a method of thermally controlling a battery system of a vehicle includes controlling a heating control module to generate an alternating current (AC) heating current, heating the battery system to a desired temperature by applying the AC heating current to the battery system over a selected heating time duration, and monitoring a rate of increase of a temperature of the battery system during the applying. The method also includes, during the heating time duration, performing a periodic impedance measurement, the periodic impedance measurement including application of a measurement signal having a selected frequency range to the battery system for a measurement period, a length of the measurement period select to minimize a difference between a desired rate of increase and the monitored rate of increase, and adjusting the AC heating current during the applying based on the temperature and the impedance measurement.

In addition to one or more of the features described herein, the method further includes performing a temperature measurement simultaneously with the periodic impedance measurement.

In addition to one or more of the features described herein, performing the periodic impedance measurement includes pausing application of the AC heating current during the measurement period.

In addition to one or more of the features described herein, the applying is performed during a first heating period and a second heating period, the measurement period occurring between the first heating period and the second heating period.

In addition to one or more of the features described herein, the method further includes monitoring an impedance of the battery system at a frequency of the AC heating current during the first heating period and the second heating period, wherein the selected frequency range of the periodic impedance measurement is different than the frequency of the AC heating current.

In addition to one or more of the features described herein, the length of the measurement period is selected based on at least one of a property of the battery system, and an expected temperature range.

In one exemplary embodiment, a vehicle system includes a memory having computer readable instructions, and a processing device for executing the computer readable instructions, the computer readable instructions controlling the processing device to perform a method. The method includes controlling a heating control module to generate an alternating current (AC) heating current, heating a battery system to a desired temperature by applying the AC heating current to the battery system over a selected heating time duration, and monitoring a rate of increase of a temperature of the battery system during the applying. The method also includes, during the heating time duration, performing a periodic impedance measurement, the periodic impedance measurement including application of a measurement signal having a selected frequency range to the battery system for a measurement period, a length of the measurement period select to minimize a difference between a desired rate of increase and the monitored rate of increase, and adjusting the AC heating current during the applying based on the temperature and the impedance measurement.

In addition to one or more of the features described herein, performing the periodic impedance measurement includes pausing application of the AC heating current during the measurement period.

In addition to one or more of the features described herein, the applying is performed during a first heating period and a second heating period, the measurement period occurring between the first heating period and the second heating period.

In addition to one or more of the features described herein, the method includes monitoring an impedance of the battery system at a frequency of the AC heating current during the first heating period and the second heating period, wherein the selected frequency range of the periodic impedance measurement is different than the frequency of the AC heating current.

In addition to one or more of the features described herein, the length of the measurement period is selected based on at least one of: a property of the battery system, and an expected temperature range.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
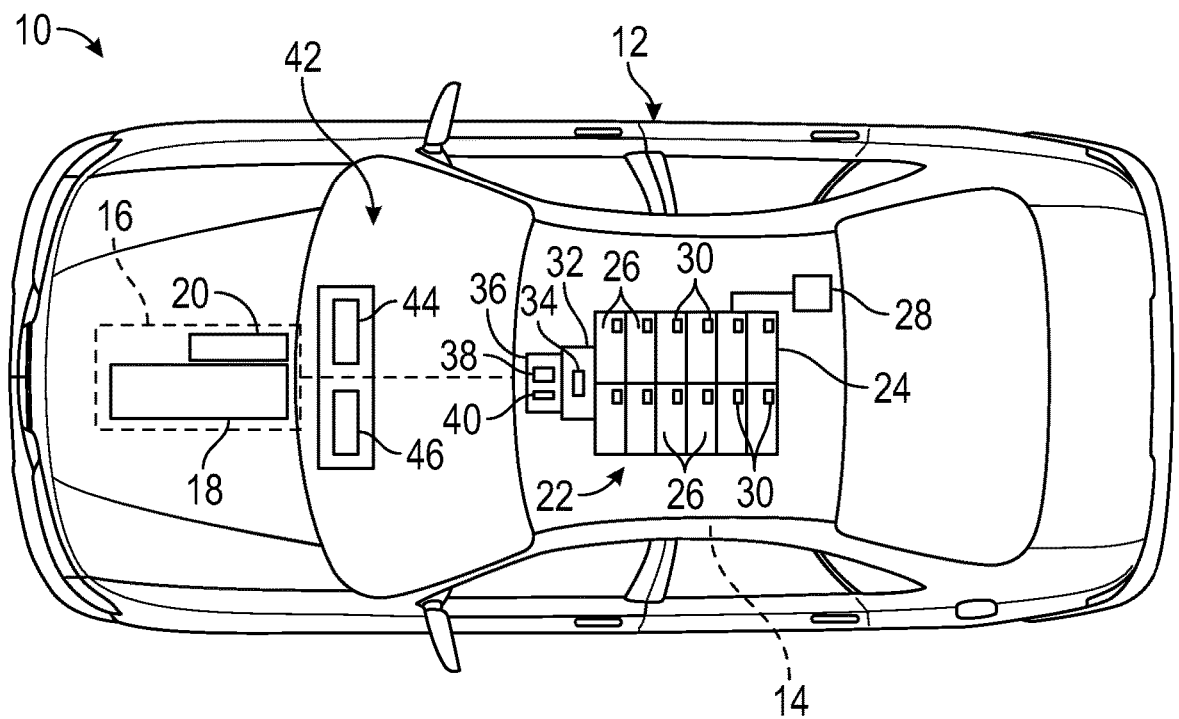
FIG. 1 is a top view of a motor vehicle including a battery assembly or system and a battery heating system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for thermal control of battery systems, such as vehicle battery systems. An embodiment of a battery heating system is configured to heat or increase the temperature of a battery system (e.g., a battery pack) by applying an alternating current (AC current) to the battery system. The battery heating system includes a controller or control module, or other processing device, configured to control a measurement device to perform impedance measurements during a heating duration or cycle without significantly affecting a rate of temperature rise.

In an embodiment, the controller periodically performs one or more impedance measurements during the duration of a heating process. The heating process is controlled to maintain a desired rate of temperature increase (temperature rise rate). Each impedance measurement is performed during a measurement period having a temporal length or extent that is selected to minimize any changes to the rate of temperature increase (or keep the changes in the temperature rise rate to within a selected range of a desired temperature rise rate).

In an embodiment, the periodic impedance measurement is performed during each measurement period using electrochemical impedance spectroscopy (EIS). A temperature measurement may also be performed during each measurement period.

Embodiments described herein present numerous advantages and technical effects. The embodiments provide for uniform and controllable heating of a battery assembly or system using existing vehicle components, and provide for the ability to perform accurate impedance and temperature measurements without significantly affecting a rate of temperature increase. In addition, the embodiments leverage impedance and cell internal temperature information to improve AC heating control in terms of reducing steady state temperature error, improving heating rate control, and providing an ability to adjust a desired temperature rise rate based on cell aging.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

The embodiments are not limited to use with any specific vehicle or device or system that utilizes battery assemblies, and may be applicable to various contexts. For example, the embodiments may be used with automobiles, trucks, aircraft, construction equipment, farm equipment, automated factory equipment and/or any other device or system that may use electronic devices having semiconductor switches.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle may be a combustion engine vehicle, an electrically powered vehicle (EV) or a hybrid electric vehicle (HEV). In an example, the vehicle 10 is a hybrid vehicle that includes a combustion engine 18 and an electric motor 20.

The vehicle 10 includes a battery system 22, which may be electrically connected to the motor 20 and/or other components, such as vehicle electronics. In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 includes various conversion devices for controlling the supply of power from the battery pack 24 to the motor 20 and/or electronic components. The conversion devices include a DC-DC converter module 32 for adjusting direct current (DC). The DC-DC converter module 32 is electrically connected to the battery system 22 and includes a DC-DC converter circuit 34 (referred to herein as a DC-DC converter 34).

The conversion devices also include an inverter module 36 that includes an inverter circuit 38 (referred to herein as an inverter 38). The inverter 38 receives DC power from the DC-DC converter 34 and converts direct current (DC) power to alternating current (AC) power that is supplied to the electric motor 20. The inverter 38 includes one or more sets of switches or switching devices (e.g., controllable semiconductor switches such as metal-oxide-semiconductor field-effect transistors (MOSFETs)) that are controllable to supply AC power to each phase of the motor 20.

Components of the vehicle 10 form all or part of a heating system configured to generate an alternating current (AC) signal (also referred to as an "AC current," a "heating current" or an "AC heating current") and apply the AC heating current to the battery pack 24. The heating system may be used to heat the battery pack 24 during vehicle motion, when the vehicle 10 is operating and at a stand-still, and/or during charging of the vehicle 10.

In an embodiment, the heating system is configured to use energy generated by the battery pack 24 and an electric motor and/or charging station (or other energy source) to apply an AC heating current to the battery pack 24 by controlling a conversion device (e.g., the inverter 38 and/or the DC-DC converter 34). The AC heating current may be generated by controlling components of the conversion device as a quasi-resonant circuit (QRC).

The heating system includes a heating control module 40 configured to control aspects of heating, including controlling switches in a conversion device (e.g., the inverter 38 or the DC-DC converter 34) to connect and disconnect the conversion device to and from the battery pack 24, and to control conversion circuitry (e.g., as a QRC) to generate the AC heating current. The control module 40 is configured to monitor battery parameters (e.g., temperature, voltage, current and impedance) during a heating process or heating cycle, and control the AC heating current (e.g., by controlling frequency) to heat the battery pack 24 and/or one or more of the modules 26 in a controlled manner. As discussed further herein, the control module 40 periodically performs in-situ impedance and/or temperature measurements to maintain a desired temperature rise rate.

The control module 40 may be a dedicated controller installed in the inverter module 36 as shown, or disposed elsewhere. The control module 40 may be an existing controller, such as the monitoring unit 28 or a computer system 42. The heating control module 40 (also referred to as a controller) can also be realized using a combination of controllers.

It is noted that the heating system is not limited to the system shown in FIG. 1. The heating system may include any suitable device or component (installed in the vehicle or external to the vehicle) that can apply an AC heating current to a battery system.

The computer system 42 includes one or more processing devices 44 and a user interface 46. The various processing devices and units may communicate with one another via a communication device or system, such as a controller area network (CAN) or transmission control protocol (TCP) bus.

Figure 2:
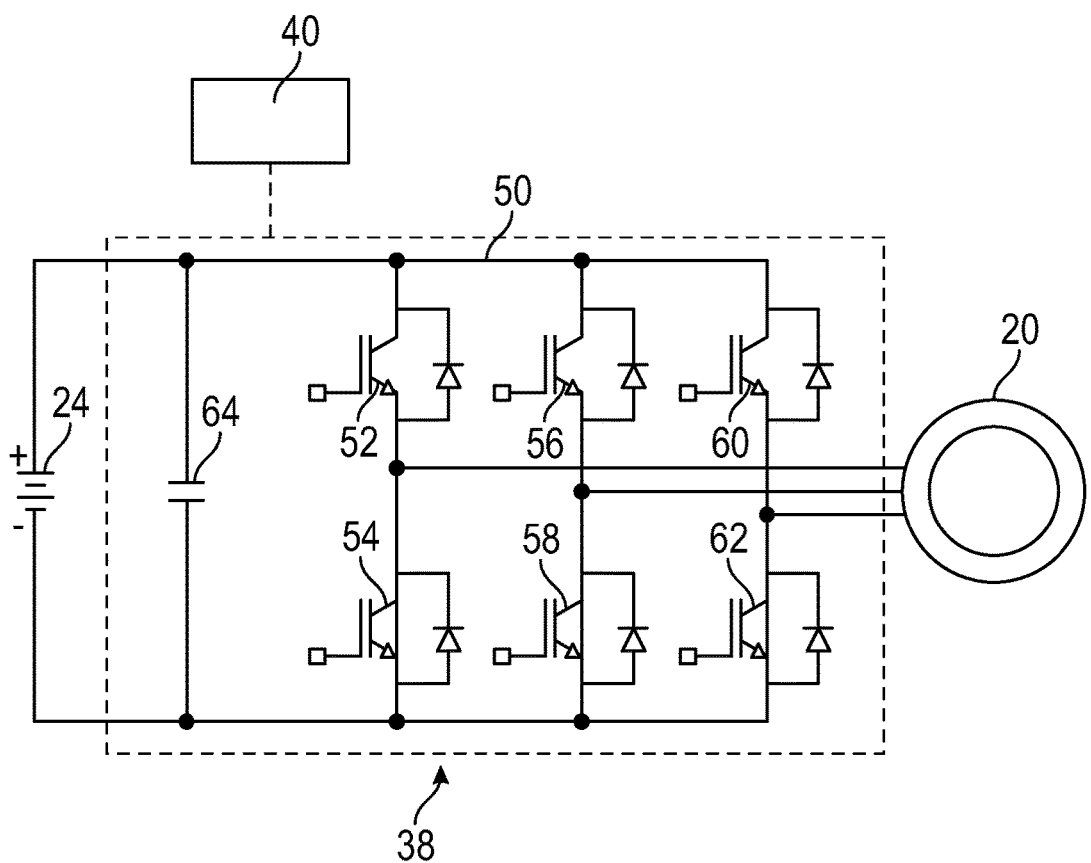
FIG. 2 depicts a portion of a motor propulsion system, including components used by a battery heating system, in accordance with an exemplary embodiment.

FIG. 2 depicts components of the propulsion system 16 and the battery pack 24, including components of an embodiment of the heating system. The propulsion system includes the inverter 38 coupled to the motor 20. Components of the inverter 38 are employed as part of the heating system and controlled by the control module 40 to apply an AC heating current to heat the battery pack 24.

In an embodiment, the inverter 38 is a three-phase inverter connected to the battery pack 24 via a DC propulsion bus 50. The inverter 38 includes three sets of switches connected in parallel to one another and connected to the battery pack 24 and the motor 20. Each set of switches is in a half-bridge configuration. A first set of switches 52 and 54 is connected to a first motor phase (phase A), a second set of switches 56 and 58 connected to a second motor phase (phase B), and a third set of switches 60 and 62 is connected to a third motor phase (phase C). A capacitor 64 is connected in parallel to the sets of switches for filtering out current ripple.

Any suitable device may be employed as a switch. For example, the switches can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (SiC) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

The heating control module 40 provides a control signal, such as a pulse width modulation (PWM) signal, having a selected or preset period between pulses and pulse width. The control signal is adjusted based on a desired amount of heating and rate of temperature increase by adjusting signal parameters such as pulse width, duty cycle, frequency, signal amplitude and others.

For example, the control module 40 operates the inverter 38 to generate an AC heating current by putting the switch 52 into an ON state or closed state, and putting the switch 54 into an OFF state or open state for a period of time. Thereafter, the switch 52 is opened (put into an OFF state) and the switch 54 is closed (put into an ON state) to couple the capacitor 64 to the battery pack 24 and place a series LC combination across the battery pack 24. "L" refers to inductance and "C" refers to capacitance. The switch 52 is left in the OFF state and the switch 54 is left in the ON state long enough for the QRC to oscillate.

During a heating duration or cycle, the battery temperature is continuously or periodically monitored to determine when the battery system 22 is sufficiently heated, and to ensure that the battery system 22 is not excessively heated. The temperature may also be monitored to so that the AC heating current can be controlled to increase the temperature at a controlled rate.

An embodiment of the heating system includes one or more devices for estimating temperature (and/or other parameters such as resistance and inductance) based on measurements of impedance of the battery pack 24, battery module(s) 26 and/or cells. In an embodiment, the heating system includes an impedance measuring device that is used to measure impedance by applying an AC measurement signal or signals having selected frequency or frequency range. The impedance measuring device is controlled to acquire accurate measurements of battery internal temperature and resistance during an AC heating cycle.

Figure 3:
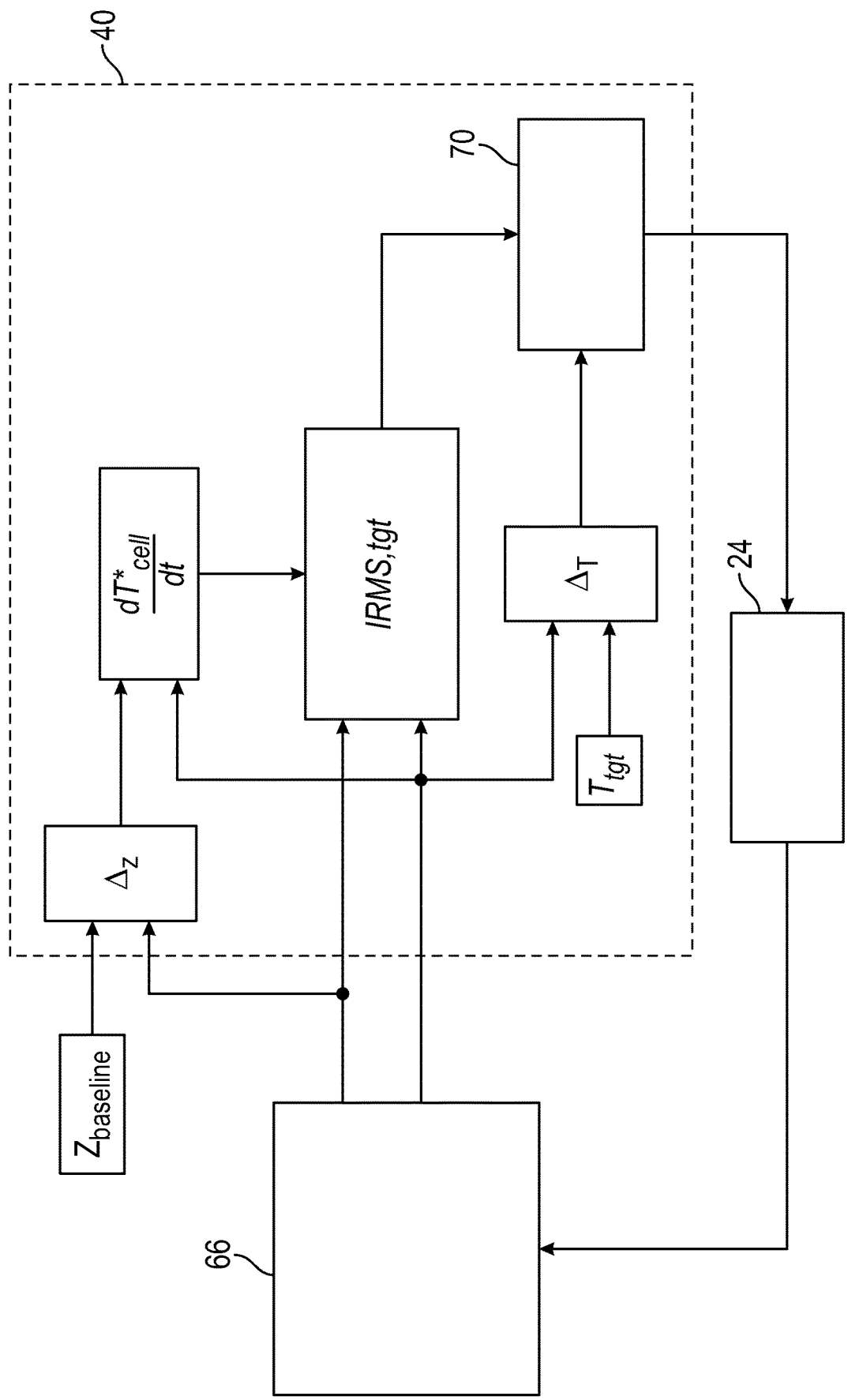
FIG. 3 schematically depicts a battery heating control module and aspects of a method of heating a battery system.

FIG. 3 schematically illustrates components of the heating system and aspects of temperature measurements performed by the control module 40. The control module 40 in this embodiment utilizes feedback control based on measuring various parameters, including periodic measurements of impedance.

As shown, the heating system includes an impedance measurement device 66. The impedance measurement device 66 is configured to apply an AC current (also referred to as a measurement current) having a selected frequency or frequency range, and measure a current and voltage response. In an embodiment, the impedance measurement device 66 is configured to measure impedance using electrochemical impedance spectroscopy (EIS). Electrochemical impedance is typically measured by applying an AC potential to an electrochemical cell and then measuring the current through the cell. The AC potential is applied, for example, by applying an AC measurement current to the battery pack 24 over a range of frequencies. EIS measurements are advantageous in that they are not time consuming and do not need cells to be rested.

Figure 4:
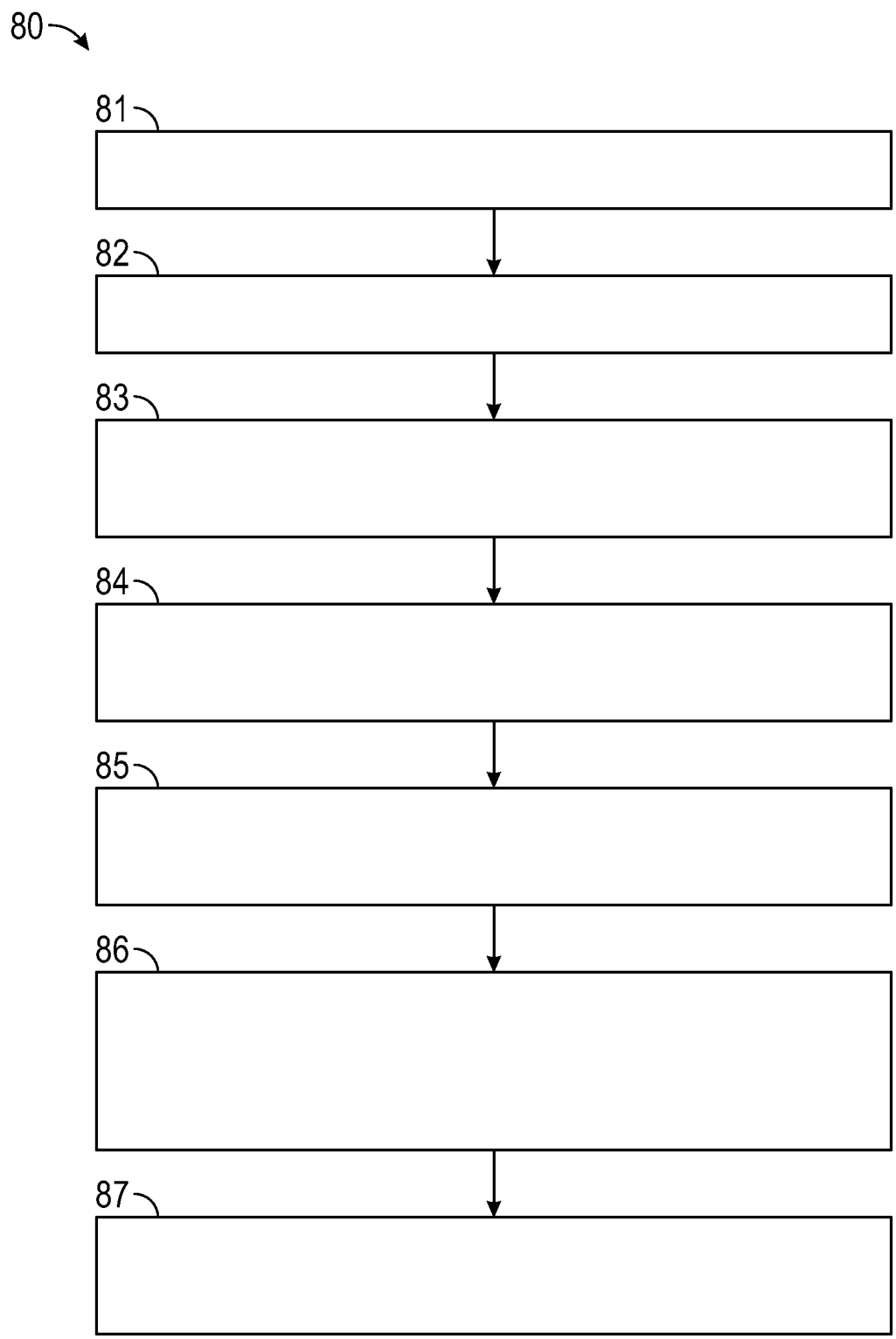
FIG. 4 is a flow diagram depicting aspects of a method of heating a battery system and performing impedance and other parameter measurements, in accordance with an exemplary embodiment.

FIG. 4 illustrates embodiments of a method 80 of heating a battery system and monitoring battery temperature and other properties during heating. Aspects of the method 80 may be performed by the control module 40 or other suitable processing device.

The method 80 is described in conjunction with the vehicle 10 and components thereof, but is not so limited, as the method 80 may be performed in conjunction with any suitable vehicle or battery assembly, and with any suitable device or system that utilizes battery storage. In addition, the method 80 is described as being performed by the control module 40 using a control scheme shown in FIG. 3, but is not so limited.

The method 80 includes a number of steps or stages represented by blocks 81-87. The method 80 is not limited to the number or order of steps therein, as some steps represented by blocks 81-87 may be performed in a different order than that described below, or fewer than all of the steps may be performed.

At block 81, a battery heating process (referred to as a heating cycle) is initiated. The cycle may be initiated based on a request entered by a user, a request generated by a vehicle system (e.g., the RESS system, computer system 42, etc.). In an embodiment, the heating cycle is initiated in response to temperature measurements of the battery system (e.g., the cycle is initiated if the battery temperature is below a selected temperature). In other embodiment, the cycle can be initiated automatically at vehicle start-up or in response to other conditions.

At block 82, initial parameters including an initial temperature of the battery system 22 is measured. Other parameters may be measured or determined, such as the state of charge (SOC) and nominal voltage of each cell.

At block 83, heating parameters are determined based on the initial temperature. In an embodiment, the initial temperature, a target cell temperature ($T_{tgt}$), and time frame or duration for heating are used to calculate a desired rate of temperature increase or temperature rise rate (($dT^*_{cell}$)/dt) for each cell.

At block 84, the initial temperature and SOC of each cell in the battery module 26 are used to determine (e.g., by input to a lookup table (LUT)) a pre-calibrated baseline cell impedance ($Z_{baseline}$). The desired temperature rise rate and the impedance $Z_{baseline}$ are used to estimate a root mean square (RMS) of the desired current through each cell. The desired current is denoted as $I_{cell,RMS}$, and may be calculated based on the following equation:

$$I^2_{cell,RMS} = \frac{1}{R_{cell}} * \left( \left( \frac{1}{\text{\# cells in a module}} * m_{mod} * C_{p,mod} * \frac{dT^*_{cell}}{dt} \right) - hA(\overline{T_{cell}} - T_{amb}) \right)$$

In this equation, $m_{mod}$ is the mass of the battery module, $C_{p,mod}$ is the specific heat capacity of a module, and hA is the product of a heat transfer coefficient and an effective area of a cooling surface. $T_{amb}$ is ambient temperature. The square root of $I_{cell,RMS}$ is iteratively calculated and provided as a desired battery AC heating current $I_{cell,RMS}$, which represents the amplitude of the desired AC current waveform.

At block 85, the AC heating current $I_{cell,RMS}$ having a selected AC frequency (referred to as heating current frequency) and amplitude is applied to each battery cell (e.g., in a module). The heating current is applied, for example, by controlling switches in the inverter 38 or the DC-DC converter 34. Amplitude and frequency of the current are controlled to effect the desired temperature rise rate (dT*cell)/dt and may be maintained until a measured temperature $T_{meas}$ reaches a desired value or charging stops.

At block 86, during the heating cycle, the control module 40 measures the temperature $T_{meas}$, impedance ($Z_{meas}$), current (I), voltage (V) and/or other parameters to continually or periodically adjust the heating current $I_{cell,RMS}$. At least some measurements of temperature and impedance are performed periodically or continuously for a selected duration (measurement period), for use in controlling the heating current and acquiring impedance and temperature measurements without significantly affecting the temperature rise rate.

In an embodiment, one or more impedance measurements are performed (e.g., using the impedance measurement device 66 of FIG. 3) using a frequency-dependent impedance measurement, such as an EIS measurement. The impedance measurement is performed periodically during the heating cycle. This measurement is performed during one or more measurement periods, during which the heating is briefly paused (the AC heating current $I_{cell,RMS}$ is turned off) and the impedance measurement is performed by applying a measurement current having a selected frequency $f_{EIS}$. During each measurement period, one measurement may be performed using one frequency or multiple measurements may be performed at multiple frequencies. In addition, the temperature $T_{meas}$ may be measured during each measurement period.

The temporal length or extent of the heating period is selected so that the temperature rise rate does not significantly change due to the impedance measurement. The measurement period length may also be selected based on battery properties and/or expected temperature range. The measurement period length may be determined based on a look-up table or other source of information. For example, the measurement period length can be determined based on temperature measurements of battery casing materials or other materials, cell or battery resistance or impedance measurements (which are functions of temperature), time for measurements to stabilize, and/or desired time to run an algorithm. In an embodiment, the measurement period length is selected based on measurement current frequency. For example, if the measurement current frequency is 50 Hz, measurements are sampled every 0.2 seconds. The control module 40 takes 10 samples, which corresponds to a total measurement period length of about 0.2 seconds.

At block 87, the control module 40 continuously or periodically adjusts the AC heating current to maintain the temperature rise rate at a desired rate (or within some range of the desired rate. The control module 40 may also adjust the heating rate based on changes in battery or external conditions. In an embodiment, the control module uses a feedback control method as illustrated at FIG. 3.

For example, referring to FIG. 3, the cell impedance $Z_{meas}$ and temperature $T_{meas}$ are measured or calculated. $Z_{meas}$ is compared to $Z_{baseline}$, and a difference ($\Delta z$) is calculated. The impedance difference $\Delta z$ and the target cell temperature rate of increase are used to calculate a target heat current ($I_{RMS,tgt}$).

In addition, the target temperature $T_{tgt}$ and the measured temperature $T_{meas}$ are compared to determine a difference $\Delta T$. The desired rate of increase, target current $I_{RMS,tgt}$, and difference $\Delta T$ are fed to a feedback control 70. The feedback control 70 limits the current $I_{cell,RMS}$ if the measured rate of rise exceeds the desired rate of rise.

Periodic impedance measurements as described herein provide more accurate voltage and temperature so that, for example, the control module 40 or other control system (e.g., RESS or battery management system) can more effectively regulate heating and prevent undervoltage and overvoltage.

For example, cell voltage measurements during AC heating can provide inaccurate readings due to inductive effects. In addition, control systems utilizing wireless measurements can have bandwidth issues resulting in erroneous voltage measurements. At very high and low SOC, heating current needs to be controlled accurately to keep the average cell voltage within bounds (e.g., between 2.5 V and 4.2 V). In addition, the temperature measurement of the cell can be inaccurate since the sensor is instrumented on the cell surface. This methods described herein can address such issues to provide more effective control, using hardware that is already onboard to perform in-situ cell impedance measurements.

Figure 5:
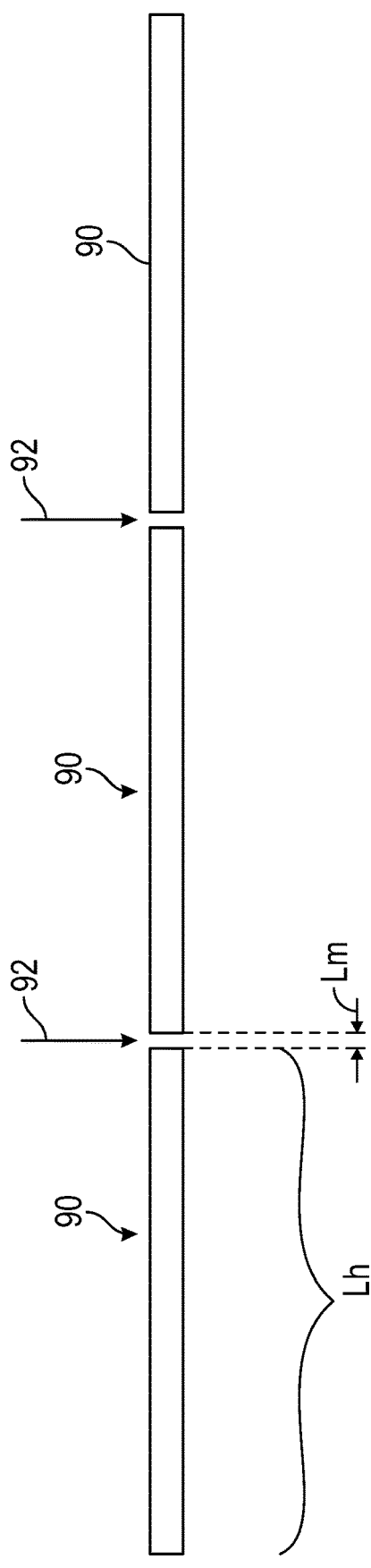
FIG. 5 depicts a duration of a heating process and illustrates an example of timing of impedance and temperature measurements, in accordance with an exemplary embodiment.

FIG. 5 illustrates an example of a heating cycle and measurement periods. In this example, the AC heating current is applied to the battery pack 24 in a selected frequency range. The AC heating current is initiated and applied for an initial heating period 90 having a heating period length $L_h$. Cell impedance may be measured at the frequency ($f_{heating}$) of the applied heating current $I_{cell,RMS}$ during the initial heating period and at subsequent heating periods 90.

At the end of the heating period 90, the heating current is turned off and an impedance measurement is performed at a frequency range $f_{EIS}$ (e.g., about 500 Hz or more, or about 800 Hz to about 10 KHz) that is different than the heating current frequency $f_{heating}$. Heating is paused and the impedance measurement is performed during a measurement period 92 having a length $L_m$ (e.g., less than one second) selected so that the temperature rise rate is not significantly affected. For example, each heating period 90 has a length La of about 120 seconds, and each measurement period 92 has a length $L_m$ of about 0.5 seconds.

It is noted that the length of the heating period (or periods) 90 may also be selected to limit effects on the temperature rise rate. At the end of the heating period 90, the impedance measurement is stopped and heating is continued by again applying the AC heating current. The length and number of heating periods, and the length and number of measurement periods is not limited to any specific examples described herein.

Figure 6:
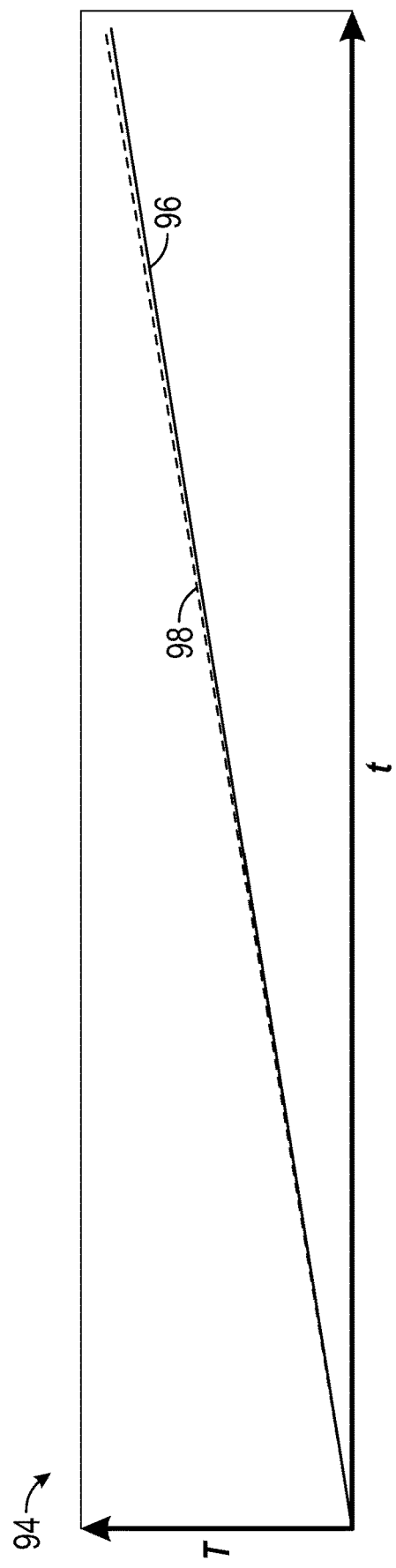
FIG. 6 is a graph that depicts an example of a rate of temperature increase during the heating process of FIG. 5, and a rate of temperature increase during an existing or conventional process.

FIG. 6 shows a graph 94 of the temperature (T) of the battery pack 24 as a function of time (t), and illustrates an advantage of the method 80. The graph 94 includes a first curve 96 that represents the temperature rise rate using the method 80 to heat the battery pack 24. A second curve 98 represents the temperature rise rate during AC heating of the battery pack 24 without pausing heating and performing periodic impedance measurements. As can be seen, by selecting an appropriate measurement period, the temperature rise rate was not significantly affected.

Figure 7:
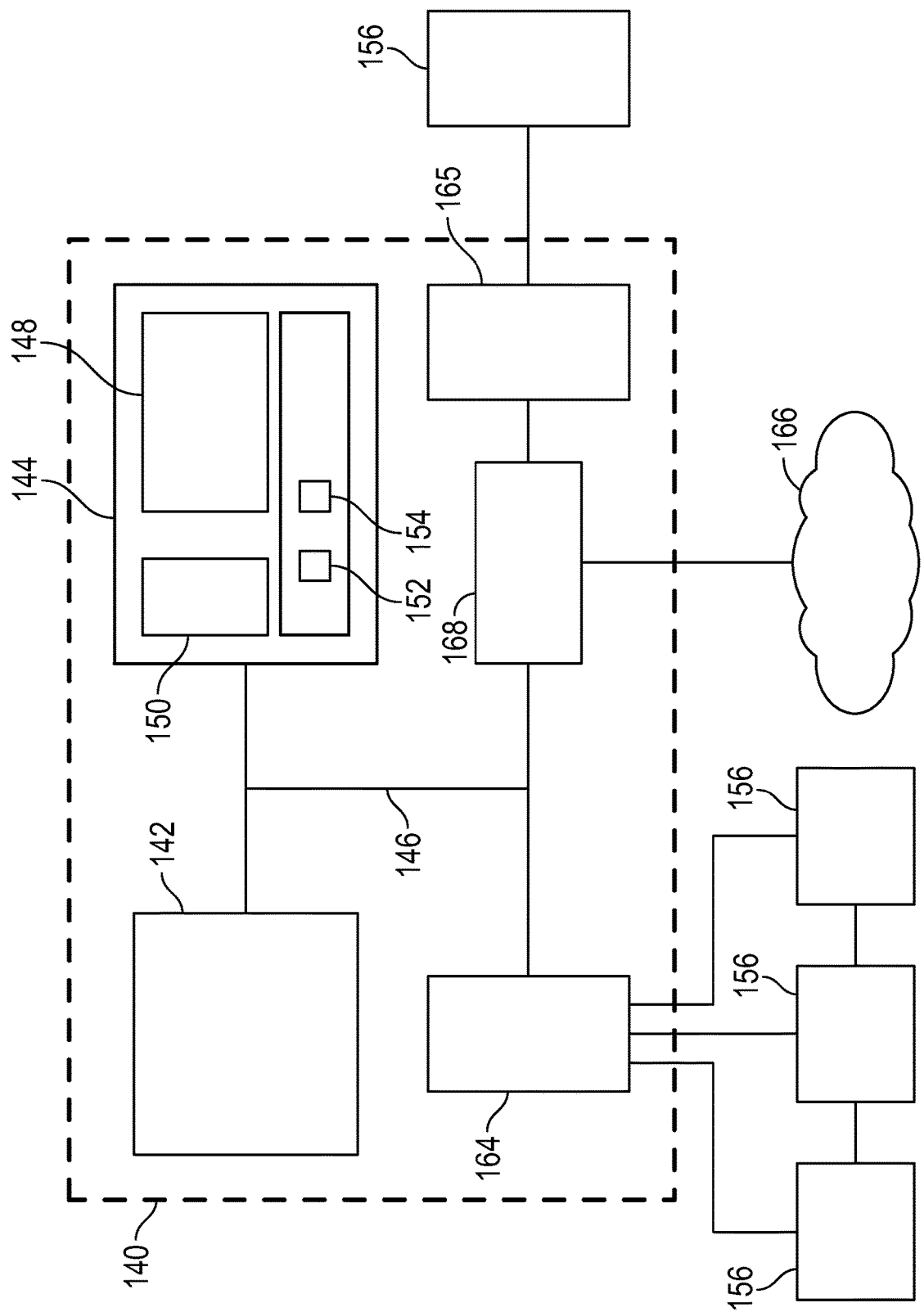
FIG. 7 depicts a computer system in accordance with an exemplary embodiment.

FIG. 7 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a battery system, and a module 154 may be included to perform functions related to battery heating as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A device for thermal control of a battery system, comprising:
    a heating control module configured to generate an alternating current (AC) heating current and heat the battery system to a desired temperature by applying the AC heating current to the battery system over a selected heating time duration, the heating control module configured to:
        monitor a rate of increase of a temperature of the battery system during the applying;
        during the heating time duration, perform a periodic impedance measurement, the periodic impedance measurement including application of a measurement signal having a selected frequency range to the battery system for a measurement period, a length of the measurement period select to minimize a difference between a desired rate of increase and the monitored rate of increase; and
        adjust the AC heating current during the applying based on the temperature and the impedance measurement.

2. The device of claim 1, wherein the heating control module is configured to perform a temperature measurement simultaneously with the periodic impedance measurement.

3. The device of claim 1, wherein performing the periodic impedance measurement includes pausing application of the AC heating current during the measurement period.

4. The device of claim 1, wherein the application is performed during a first heating period and a second heating period, the measurement period occurring between the first heating period and the second heating period.

5. The device of claim 4, wherein the heating control module is configured to monitor an impedance of the battery system at a frequency of the AC heating current during the first heating period and the second heating period, and wherein the selected frequency range of the periodic impedance measurement is different than the frequency of the AC heating current.

6. The device of claim 1, wherein the length of the measurement period is selected based on at least one parameter selected from the group consisting of a property of the battery system, and an expected temperature range.

7. The device of claim 6, wherein the length of the measurement period is selected based on an age of the battery system.

8. The device of claim 1, wherein the heating control module is electrically connected to the battery system and a conversion device configured to control power output from the battery system, the heating control module configured to control the conversion device to generate the AC heating current.

9. The device of claim 8, wherein the battery system is connected to an electric motor connected to an inverter, and the heating control module is configured to control a phase leg of the inverter to generate the AC heating current.

10. A method of thermally controlling a battery system of a vehicle, comprising:
    controlling a heating control module to generate an alternating current (AC) heating current;
    heating the battery system to a desired temperature by applying the AC heating current to the battery system over a selected heating time duration;
    monitoring a rate of increase of a temperature of the battery system during the applying;
    during the heating time duration, performing a periodic impedance measurement, the periodic impedance measurement including application of a measurement signal having a selected frequency range to the battery system for a measurement period, a length of the measurement period select to minimize a difference between a desired rate of increase and the monitored rate of increase; and
    adjusting the AC heating current during the applying based on the temperature and the impedance measurement.

11. The method of claim 10, further comprising performing a temperature measurement simultaneously with the periodic impedance measurement.

12. The method of claim 10, wherein performing the periodic impedance measurement includes pausing application of the AC heating current during the measurement period.

13. The method of claim 10, wherein the applying is performed during a first heating period and a second heating period, the measurement period occurring between the first heating period and the second heating period.

14. The method of claim 13, further comprising monitoring an impedance of the battery system at a frequency of the AC heating current during the first heating period and the second heating period, wherein the selected frequency range of the periodic impedance measurement is different than the frequency of the AC heating current.

15. The method of claim 10, wherein the length of the measurement period is selected based on at least one parameter selected from the group consisting of a property of the battery system, and an expected temperature range.

16. A vehicle system comprising:
- a non-transitory computer readable medium having computer readable instructions; and
- a processing device for executing the computer readable instructions, the computer readable instructions controlling the processing device to perform a method including:
- controlling a heating control module to generate an alternating current (AC) heating current;
- heating a battery system to a desired temperature by applying the AC heating current to the battery system over a selected heating time duration;
- monitoring a rate of increase of a temperature of the battery system during the applying;
- during the heating time duration, performing a periodic impedance measurement, the periodic impedance measurement including application of a measurement signal having a selected frequency range to the battery system for a measurement period, a length of the measurement period select to minimize a difference between a desired rate of increase and the monitored rate of increase; and
- adjusting the AC heating current during the applying based on the temperature and the impedance measurement.

17. The vehicle system of claim 16, wherein performing the periodic impedance measurement includes pausing application of the AC heating current during the measurement period.

18. The vehicle system of claim 16, wherein the applying is performed during a first heating period and a second heating period, the measurement period occurring between the first heating period and the second heating period.

19. The vehicle system of claim 18, wherein the method includes monitoring an impedance of the battery system at a frequency of the AC heating current during the first heating period and the second heating period, wherein the selected frequency range of the periodic impedance measurement is different than the frequency of the AC heating current.

20. The vehicle system of claim 16, wherein the length of the measurement period is selected based on at least one parameter selected from the group consisting of a property of the battery system, and an expected temperature range.

* * * * *